United States Patent [19]

Pringle et al.

[11] Patent Number: 4,721,162
[45] Date of Patent: Jan. 26, 1988

[54] FLUID LEVEL CONTROLLED SAFETY VALVE

[75] Inventors: Ronald E. Pringle, Houston; Paul W. Black, Sugarland, both of Tex.

[73] Assignee: Camco, Incorporated, Houston, Tex.

[21] Appl. No.: 645,574

[22] Filed: Aug. 29, 1984

[51] Int. Cl.⁴ .............................................. E21B 34/06
[52] U.S. Cl. .................................. 166/319; 166/321; 166/324
[58] Field of Search .............................. 166/319-321, 166/324, 325, 386, 387

[56] References Cited

U.S. PATENT DOCUMENTS

| | | | |
|---|---|---|---|
| 3,071,151 | 1/1963 | Sizer | 166/324 X |
| 3,310,114 | 3/1967 | Dollison | 166/321 X |
| 3,860,066 | 1/1975 | Pearce et al. | 166/324 X |
| 4,103,744 | 8/1978 | Akkerman | 166/324 |
| 4,140,153 | 2/1979 | Deaton | 166/324 X |

Primary Examiner—Stephen J. Novosad
Assistant Examiner—Thuy M. Bui
Attorney, Agent, or Firm—Fulbright & Jaworski

[57] ABSTRACT

A well safety valve for use in a fluid well conduit through which fluid is produced by pumping. A body is adapted to be inserted into the conduit and includes a passageway for well fluid. A valve in the passageway opens and closes in response to the fluid level or hydrostatic pressure in the conduit. When pumping is discontinued, the fluid level in the conduit increases to a predetermined high level to close the valve. When pumping begins, the fluid level falls and when it reaches a predetermined low level the valve is opened. The valve includes an equalizing device.

10 Claims, 10 Drawing Figures

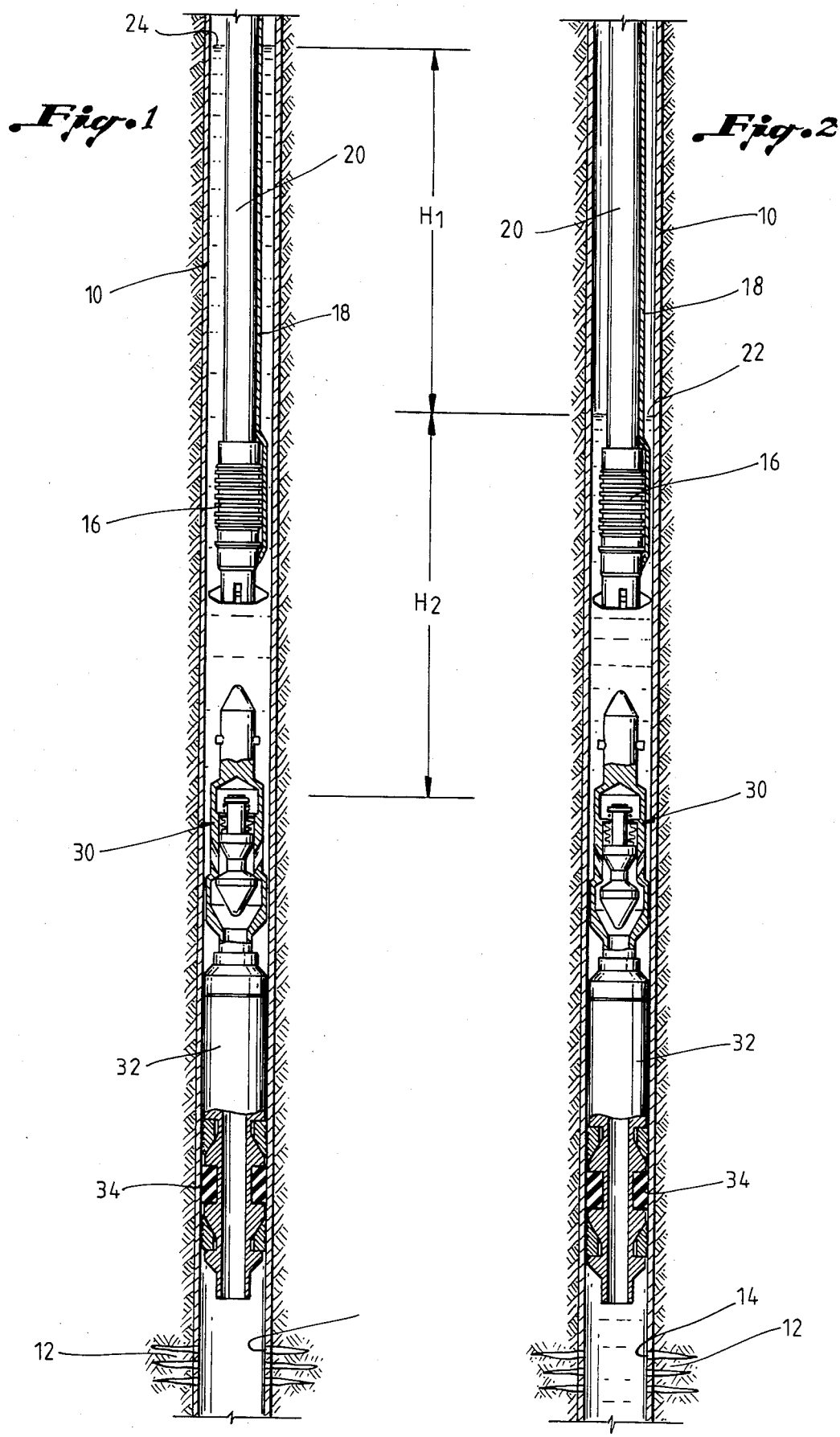

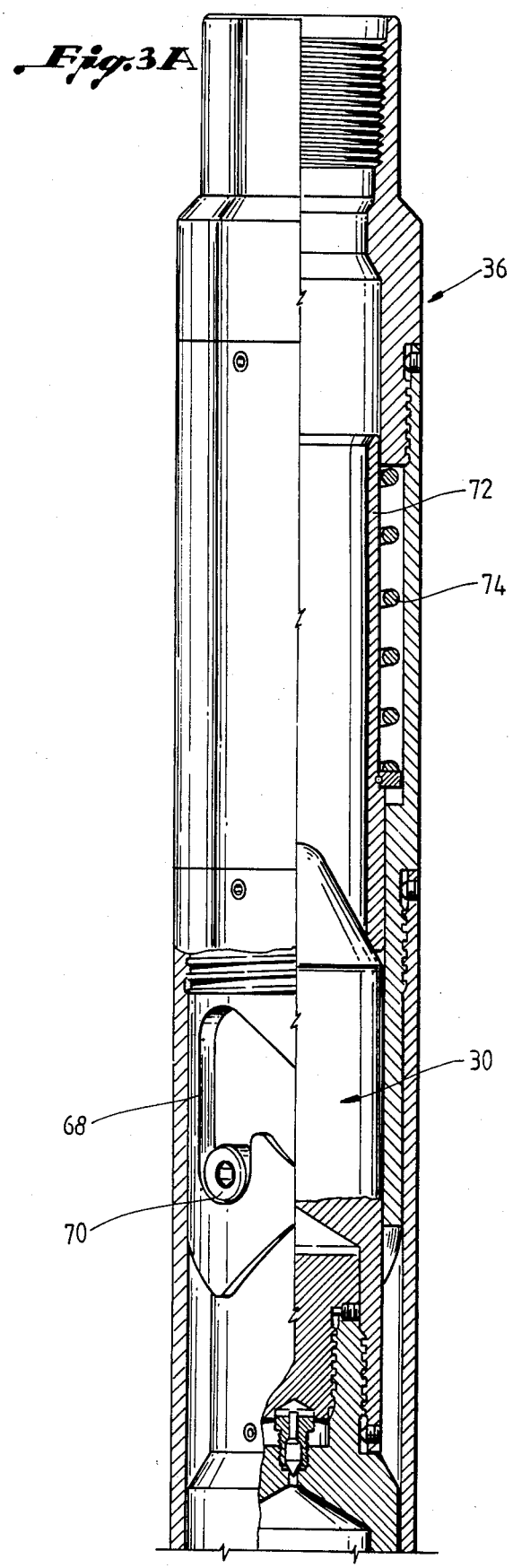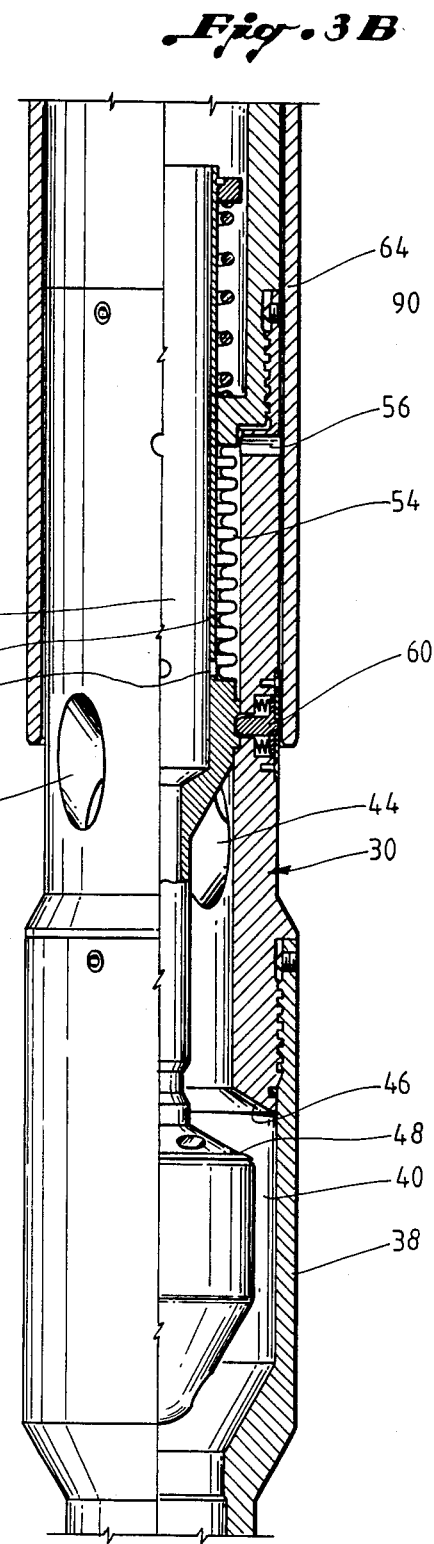

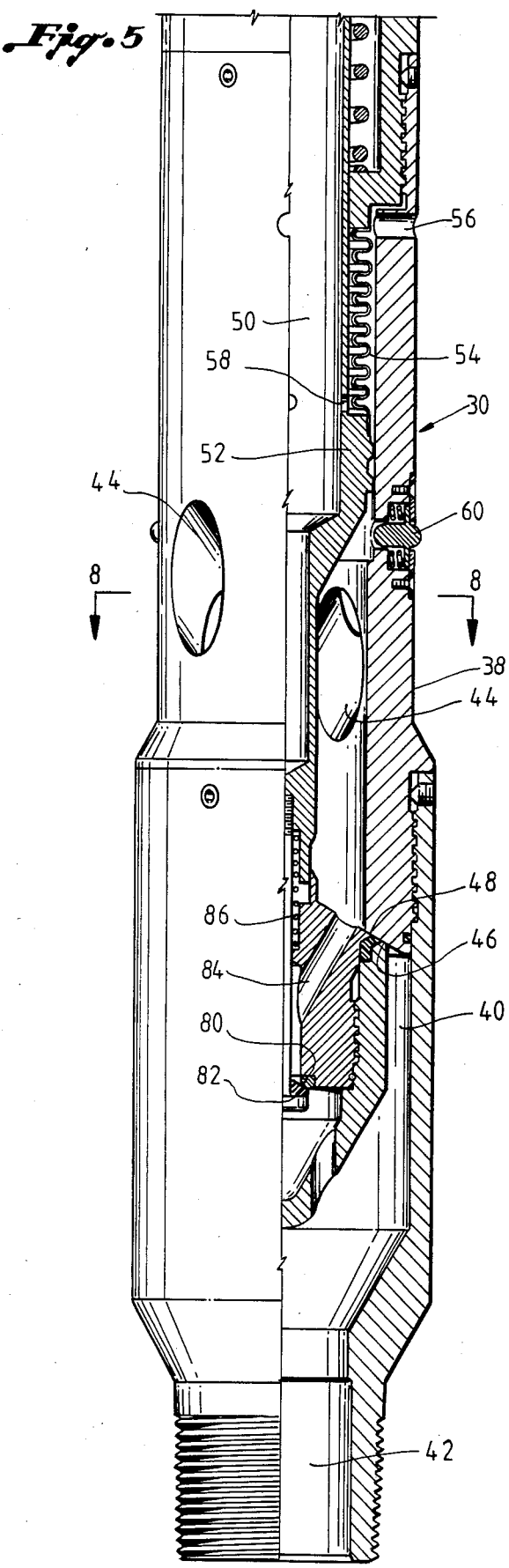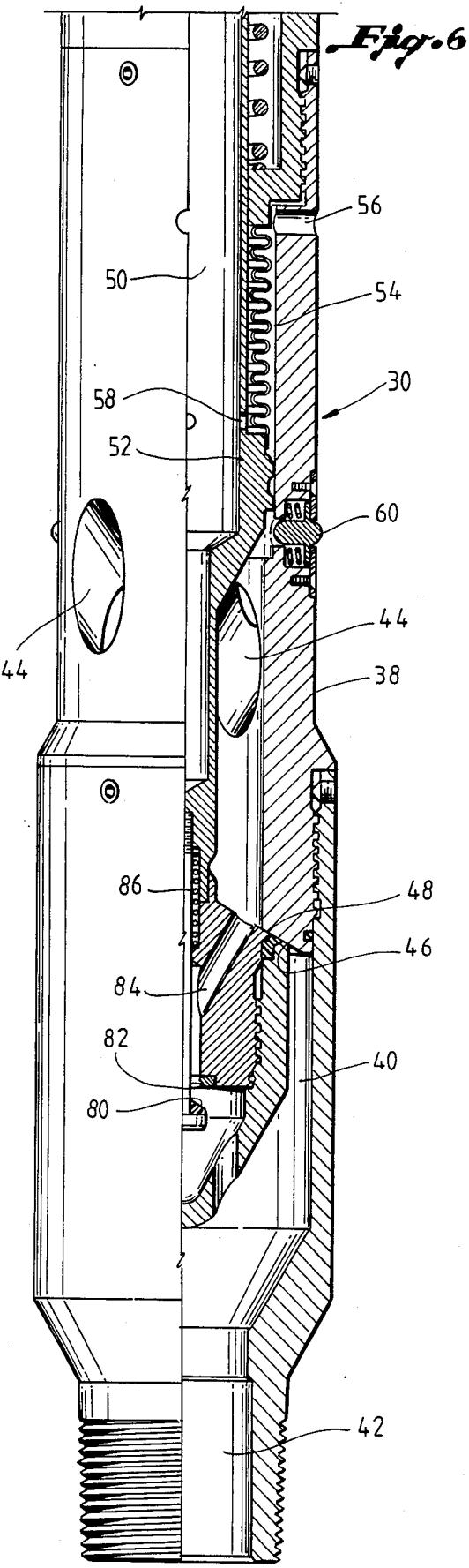

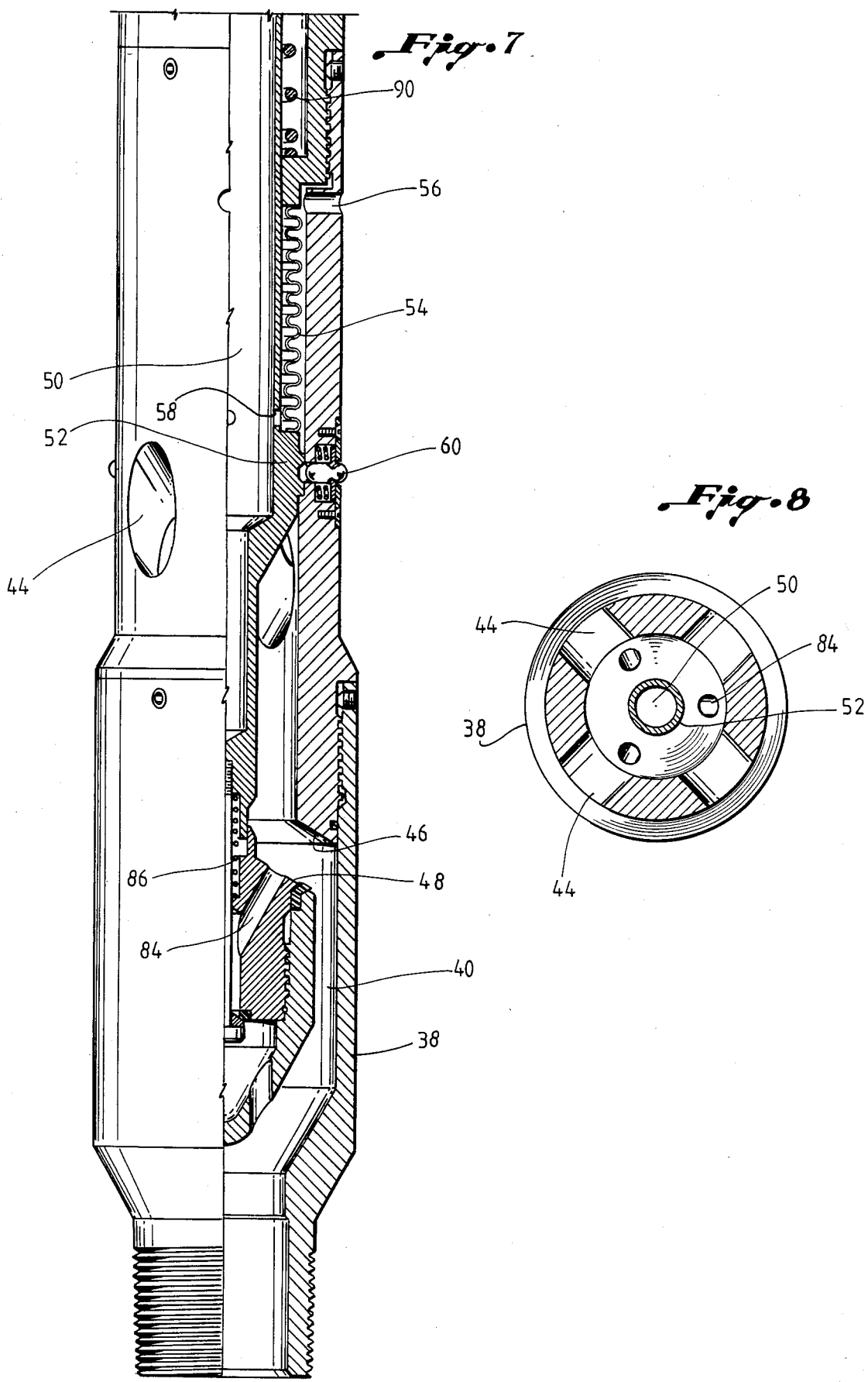

FLUID LEVEL CONTROLLED SAFETY VALVE

BACKGROUND OF THE INVENTION

In a pumping fluid well, such as an oil well, the oil from the well formation flows into a well conduit such as a casing and to the pump where it is then pumped to the well surface. However, it is sometimes desirable to shut off the flow of oil from the formation into the conduit, such as during workover operations. That is, with the pump turned off the oil from the formation will continue to flow into the conduit and rise therein and interfere with workover operations.

Therefore, one feature of the present invention is to provide a safety valve to shut off the flow of a well fluid in a well being produced by a pump, and more specifically, the present invention is directed to controlling a well safety valve by the fluid level in the well conduit. The fluid level in a well is lower when the pump is being operated than the level when pumping is stopped. That is, when the well pump is stopped, the fluid in the well conduit around the pump begins to rise and accumulate. The present invention uses the differences in the fluid level before and after pumping, which provides different hydrostatic heads which control the safety valve.

SUMMARY

The present invention is directed to a fluid level actuated well safety valve for use in a well conduit through which fluid is pumped. The safety valve includes a body adapted to be inserted into the conduit and includes a passageway for the flow of well fluid upwardly through the conduit. A valve is positioned in the passageway and includes a valve seat and a valve element for opening and closing the passageway. Biasing means is provided in the body and is connected to the valve element and acts in a direction to open the valve. A fluid level responsive means is connected to the valve element and is positioned downstream of the valve and is adapted to be exposed to the hydrostatic force of the fluid in the conduit above the valve for moving the fluid responsive means in a direction to close the valve when the hydrostatic fluid pressure overcomes the biasing means.

Another object of the present invention is wherein the valve includes an equalizing valve having a valve seat and a valve element for equalizing the pressure across the first valve prior to opening the first valve.

Another object of the present invention is to provide a safety valve to close when pumping is discontinued and the fluid in the conduit and annulus around the pump increases. One embodiment includes a bellows which is connected to the actuating mechanism of the valve to cause the valve to close with a pressure increase external to the bellows caused by the hydrostatic pressure of the fluid above the valve in the conduit. The pressure at which the valve closes is determined by a gas charge internally of the bellows. Thus, when pumping ceases and the fluid begins to rise above the valve, the pressure acting external to the bellows increases, due to the increase in the hydrostatic head of the fluid, until it overcomes the gas charge pressure inside of the bellows and the valve closes.

Another object of the present invention is to provide a safety valve to reopen with a decrease in the fluid level in the well conduit after first equalizing the pressure across the safety valve.

Yet a still further object of the present invention is the provision of a fluid level actuated well safety valve for use in a fluid well conduit through which fluid is pumped by providing a body adapted to be inserted into the conduit and including a passageway for upward flow of well fluid through the conduit. A valve is positioned in the passageway including a valve seat and a valve element for opening and closing the passageway. Biasing means in the body is connected to a valve stem and the valve element is telescopically connected to the valve stem and movable in a direction to open the valve in response to the biasing means. Fluid level responsive means is connected to the valve stem and positioned downstream of the valve and is adapted to be exposed to the hydrostatic force of the fluid in the conduit above the valve for moving the valve stem in a direction to close the valve when the hydrostatic pressure in the conduit overcomes the biasing means. An equalizing valve is connected to the valve stem and includes a valve seat and a valve element for equalizing the pressure across the first valve prior to the opening of the first valve. The first valve element is telescopically connected to the valve stem for allowing the equalizing valve element to open prior to the opening of the first valve element. Preferably, spring means are provided between the valve stem and the first valve element for urging the equalizing valve to the closed position.

Other and further objects, features and advantages will be apparent from the following description of a presently preferred embodiment of the invention, given for the purpose of disclosure, and taken in conjunction with the accompanying drawings.

BRIEF DESCRIPTION OF THE DRAWINGS

FIG. 1 is a schematic elevational view, partly in cross section, of the well safety valve of the present invention in position in a well conduit and shown in the closed position;

FIG. 2 is a schematic elevational view, partly in cross section, of the well safety valve of the present invention in position in a well conduit and shown in the open position;

FIGS. 3A, 3B and 3C are continuations of each other showing a setting tool engaging the well safety valve of the present invention and holding it in the running in position for installation in a well conduit;

FIG. 5 is a fragmentary elevational view, in quarter section, of the safety valve of the present invention shown the closed position;

FIG. 6 is a view similar to FIG. 5 showing the valve in an equalizing position;

FIG. 7 is a view similar to FIGS. 5 and 6 showing the valve in the open position; and, FIG. 8 is a cross-sectional view taken along the line 8—8 of FIG. 5.

DESCRIPTION OF THE PREFERRED EMBODIMENT

Figure 3C:
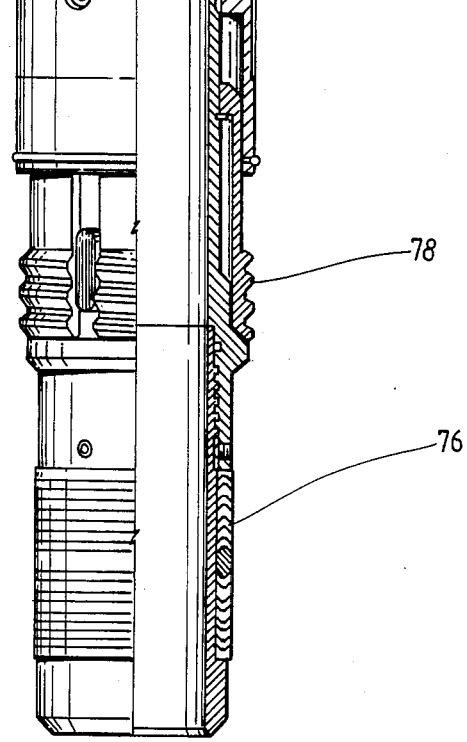

Referring now to the drawings, particularly to FIGS. 1 and 2, a well conduit or casing 10 is provided extending from the well surface down to a fluid producing formation 12, such as an oil formation, and the casing 10 includes perforations 14 for allowing the flow of oil from the formation 12 into the interior of the well conduit or casing 10. A conventional well pump 16 such as an electric pump controlled by an electric line 18 is positioned inside of the casing 10 for pumping liquid or oil to the surface through a pump tubing 20. Typically, the pumping fluid level in the casing 10 will be at level 22. However, if the pump is shut off, the fluid level in the casing 10 may rise above the desired shut in fluid level 24.

The present invention is directed to the provision of a liquid level control well safety valve generally indicated by the reference numeral 30 which is positioned in the well conduit or casing 10 and supported therein from a stinger 32 which is connected to a conventional well packer 34. The valve 30 is provided to shut off the flow of fluids from the formation 12 during workover operations or other conditions when the pump 16 is stopped. One object of the present invention is the control of the well safety valve 30 by the fluid level in the casing 10 thereby avoiding the use of more expensive and complicated controls.

During pumping operations when the pump 16 is actuated, the fluid level in the well is typically at the level 22 which is lower than the level 24. The valve 30 of the present invention is designed to close when the pump 16 is discontinued and the fluid level in the annulus in the conduit 10 reaches a predetermined high level such as level 24. And the valve 30 is provided to open when the pump 16 is operated and the fluid level drops to a predetermined low level such as level 22. That is, the valve 30 is designed to close when the fluid level head equal to $H_1$ and $H_2$ creates a sufficient hydrostatic head which will close the valve 30. However, when the head decreases to only $H_2$ the hydrostatic force of the head $H_2$ is insufficient to close the valve 30 and the valve 30 will open as best seen in FIG. 2.

Referring now to FIGS. 3A, 3B and 3C, the valve 30 is shown connected to a running in tool 36 and preferably to a stinger 32 for installation in the casing 10 to the well packer 34. The valve 30 generally includes a housing or body 38 adapted to be inserted into the conduit 10 and includes a passageway 40 having an inlet 42 and an outlet consisting of ports 44 whereby the fluid from the formation 12 flows through the packer 34, the interior of the stinger 32, into the inlet 42 and out of the ports 44 to the interior of the casing 10. A main valve is provided in the passageway 40 and includes a valve seat 46 and a valve element 48 for opening and closing the passageway 40. Suitable biasing means are provided in the body which may include a pressurized gas chamber 50, having a charged gas such as nitrogen, which is exposed to a movable valve stem 52 which is telescopically movable in the housing 38 and which is connected to the valve element 48 in a direction to bias the valve element 48 to the open position. Fluid level responsive means such as a bellows 54 is connected between the valve stem 52 and the housing 38 and is positioned downstream from the main valve and is in communication through a port 56 to the exterior of the housing 38 so as to be exposed to the hydrostatic force of the fluid in the conduit 10. The interior side of the bellows 54 is exposed to the pressurized gas in the chamber 50 through openings 58 in the valve stem 52. Therefore, the hydrostatic force of the fluid in the conduit 10 acts on the bellows 54 in a direction to contract the bellows 54 and to close the main valve when the hydrostatic fluid pressure in the casing 10 overcomes the pressurized gas in the chamber 50. Of course, other types of biasing means and fluid level responsive means may be used such as a spring biased piston which is exposed to the fluid level in the conduit 10.

Figure 4:
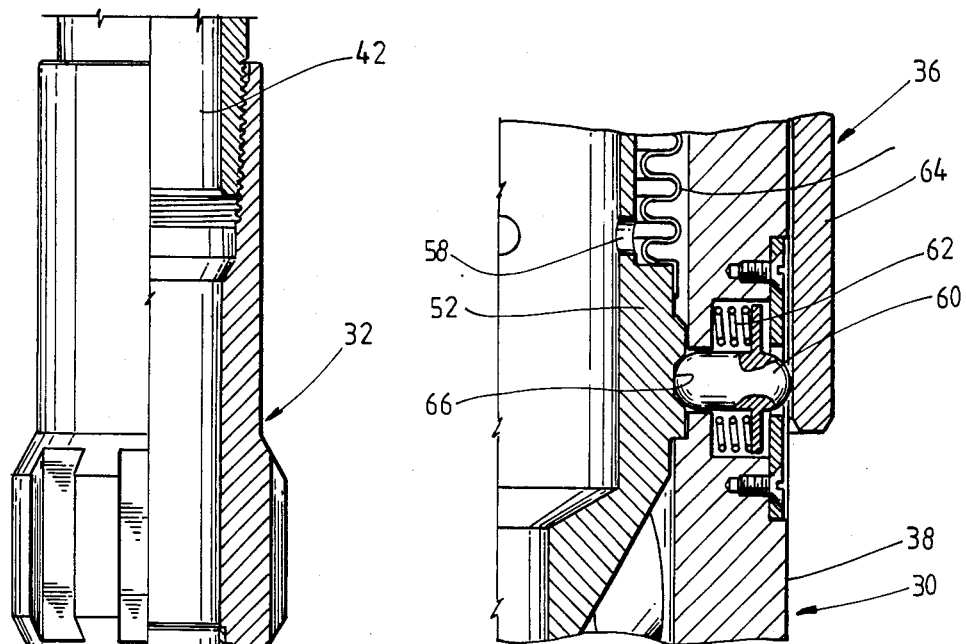
FIG. 4 is an enlarged fragmentary elevational view, in cross section, illustrating the running in tool engaging the safety valve and holding it in the open position for insertion into a well conduit.

Referring now to FIGS. 3B and 4, the body 38 of the safety valve 30 includes a detent 60 which is biased outwardly by a spring 62. However, when running the valve 30 into the conduit 10 the skirt 64 of the running tool 36 engages and presses the detent 60 inwardly into engagement with a recess 66 in the valve stem 52 for holding the valve 30 in the open position while running in. After the valve 30 is installed and the running tool 36 is removed, the detent 60 is deactuated by the spring 62.

The running tool 36 encircles the top of the valve 30 by the skirt 64 and supports the valve 30 and stinger 32 by a J-slot 68 which supports the valve 30 from the pins 70 connected to the exterior of the valve 30.

The running tool 36 includes an inner sleeve 72 which is urged downwardly by a spring 74 against the top of the valve 30 for initially holding the pins 70 in the J-slot 68 for supporting the valve and stinger 32. When the position of the packer 34 is reached, the packing seal 76 on the stinger 32 is inserted into the center of the packer 34, the stinger 32 is then rotated so that the threads 78 engage the interior of the packer 34 to support the stinger 32 an'd valve 30 from the packer 34. Thereafter, downward and right-hand rotation of the setting tool 36 will release the setting tool 36 from the valve 30.

Referring now to FIG. 5, the valve 30 is shown in the closed position. That is, the hydrostatic pressure of the fluid in the conduit 10 entering the port 56 acts against the outside of the metal bellows 54 to overcome the pressure of the gas in the chamber 50 to contract the bellows 54 and raise the valve stem 52. It is to be noted that the valve element 48 is telescopically supported from the valve stem 52.

The valve 30 also includes a second or equalizing valve having a valve seat 80 and a valve element 82 for opening and closing a passageway 84 for equalizing the pressure across the first valve, consisting of the first valve consisting of the seat 46 and valve element 48, prior to opening the first valve. The valve seat 80 is fixedly connected to the valve stem 52 and the valve element 82 may be on the element 48. Spring 86 urges element 48 downwardly to mate the valve element 82 with the seat 80 whereby fluid passageway 40 will be closed.

When the hydrostatic head drops to a lower level, such as level 22 in FIG. 2, the valve 30 will start to reopen with the decrease in the fluid level in the conduit 10. However, in order to reopen the valve element 48, it is desirable to first equalize the pressure across the valve element 48 and seat 46. As the hydrostatic force on the outside of the bellows 54 decreases, the charge pressure in the chamber 50 will overcome the hydrostatic head and move the valve stem 52 downwardly. Downward movement of the valve stem 52 carries the rigidly attached equalizing valve seat 80 downwardly to open the passageway 84 and equalize the pressure across the valve element 48 and valve seat 46 as best seen in FIG. 6. However, the cross-sectional area of the valve element 48 which is exposed to the upstream fluid in the inlet 42 is held in place by the unequal pressures across the valve element 48, in spite of the spring 86, until the pressure is generally equalized.

When the pressure across the valve seat 46 is equalized, the valve element 48 will move downwardly by the action of the pressure charge in the chamber 50 to open the main valve and close the equalizing seat 82 against the valve element 80. Thereafter, fluid flow will flow through the passageway 40 to the interior of the well conduit 10 and to the pump 16.

Therefore, the valve 30 will provide a safety valve for use in a pumping oil well which is controlled by the fluid level in the well casing.

Referring now to FIG. 3B, a fail safe means is provided such as spring 90 between a shoulder 92 on the body 38 and a shoulder 94 on the stem 52. In the event the gas pressure charge in chamber 50 is lost, for example if bellows 54 fails, the valve 30 would fail in the open position. However, spring 90 is provided to insure that the valve 30 will fail in the closed position. That is, in the event of a leak in chamber 50, the pressure on opposite sides of the bellows 54 would be balanced and spring 90 would close the valve 30.

The present invention, therefore, is well adapted to obtain the ends and advantages mentioned as well as others inherent therein. While a presently preferred embodiment of the invention is given for the purpose of disclosure, numerous changes in the details of construction and arrangement of parts will readily suggest themselves to those skilled in the art and which are encompassed within the spirit of the invention and the scope of the appended claims.

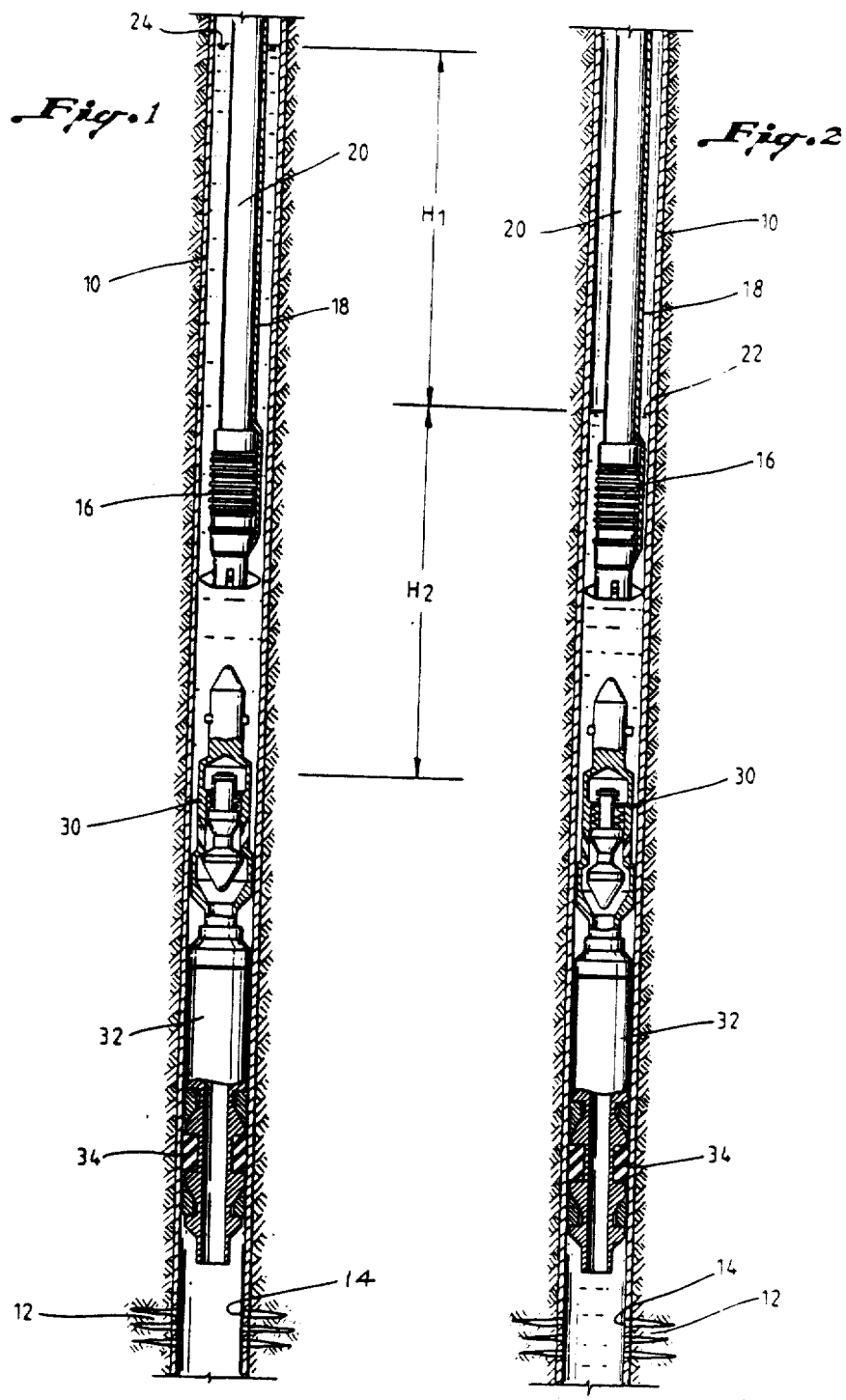

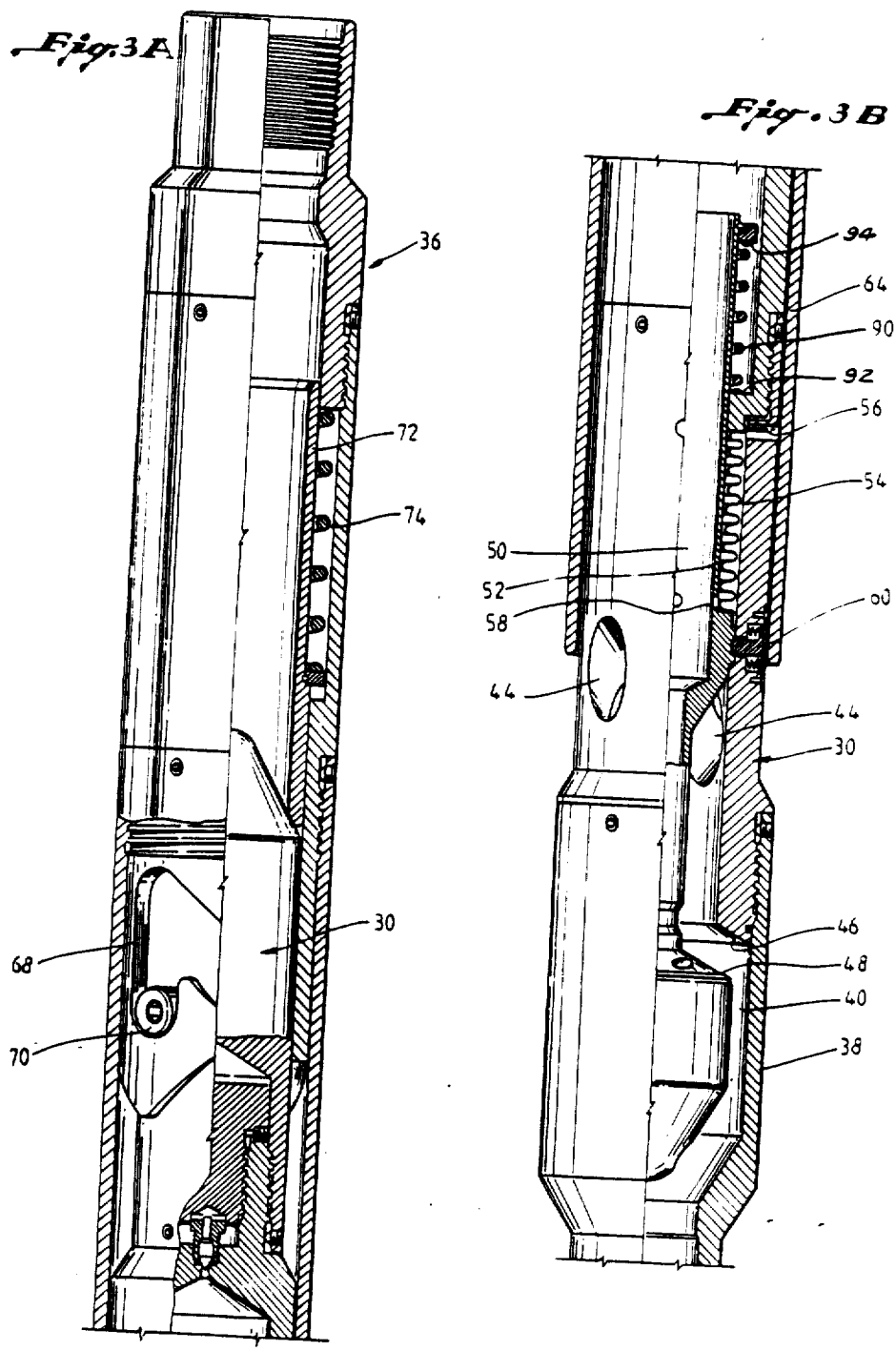

What is claimed is:

1. A fluid level actuated well safety valve for use in a fluid well conduit through which fluid is pumped comprising,
    a body adapted to be inserted into the conduit, said body including a passageway for the passage of well fluid upwardly through the conduit,
    a valve in the passageway including a valve seat and a valve element for opening and closing said passgeway,
    biasing means in the body and connected to the valve element and acting in a direction to open said valve, and
    fluid responsive means connected to the valve element and positioned downstream of the valve and said body including port means between the fluid responsive means and the exterior of the body for communicating the hydrostatic force of the fluid in the conduit to the fluid responsive means for moving the fluid responsive means in a direction to close said valve when the hydrostatic fluid pressure overcomes the biasing means.

2. The apparatus of claim 1 wherein the biasing means includes a pressurized gas chamber.

3. The apparatus of claim 1 wherein the fluid responsive means includes a bellows.

4. The apparatus of claim 1 including,
    an equalizing valve having a valve seat and a valve element for equalizing the pressure across the first valve prior to opening said first valve.

5. The apparatus of claim 4 wherein the first valve element is telescopically connected to the fluid responsive means and the equalizing valve seat is fixedly connected to the fluid responsive means.

6. A fluid level actuated well safety valve for use in a fluid well conduit through which fluid is pumped comprising,
    a body adapted to be inserted into the conduit, said body including a passageway for the passage of well fluid upwardly through the conduit,
    valve in the passageway including a valve seat and a valve element for opening and closing said passageway,
    biasing means in the body,
    a valve stem connected to the biasing means,
    said valve element telescopically connected to the valve stem and movable in a direction to open said valve in response to the biasing means,
    fluid responsive means connected to the valve stem and position downstream of the valve,
    said body including port means between the fluid responsive means and the exterior of the body for communicating the hydrostatic force of the fluid in the conduit to the fluid responsive means for moving the fluid responsive means in a direction to close said valve when the hydrostatic fluid pressure overcomes the biasing means, and
    an equalizing valve having a valve seat and a valve element, said equalizing valve seat being fixedly connected to the valve stem for equalizing the pressure across the first valve prior to the opening of the first valve.

7. The apparatus of claim 6 wherein the equalizing valve element is connected to the first valve element.

8. The apparatus of claim 7 including,
    spring means between the valve stem and the first valve element urging said equalizing valve to the closed position.

9. The apparatus of claim 8 wherein the biasing means includes a pressurized gas chamber.

10. The apparatus of claim 9 wherein the fluid responsive means includes a bellows.

* * * * *

UNITED STATES PATENT OFFICE
CERTIFICATE OF CORRECTION

Patent No. 4,721,162    Dated   January 26, 1988

Inventor(s)   Ronald E. Pringle et al.

It is certified that error appears in the above-identified patent and that said Letters Patent are hereby corrected as shown below:

Delete sheets 1 and 2 of the drawings and substitute the attached sheets 1 and 2.

Signed and Sealed this

Seventeenth Day of January, 1989

Attest:

DONALD J. QUIGG

*Attesting Officer*    *Commissioner of Patents and Trademarks*